(12) United States Patent　(10) Patent No.: US 7,748,313 B2
Tyndall　(45) Date of Patent: Jul. 6, 2010

(54) CONTINUOUS FLOW PRESSURIZED COOKER/BLANCHER

(75) Inventor: Harold L. Tyndall, Conway, SC (US)

(73) Assignee: Charlottetown Metal Products Ltd., Winsloe, PEI (CA)

( * ) Notice: Subject to any disclaimer, the term of this patent is extended or adjusted under 35 U.S.C. 154(b) by 1776 days.

(21) Appl. No.: 10/854,788

(22) Filed: May 27, 2004

(65) Prior Publication Data

US 2005/0016388 A1　Jan. 27, 2005

(30) Foreign Application Priority Data

Jun. 2, 2003　(CA) .................................... 2430635

(51) Int. Cl.
*A47J 37/12*　(2006.01)
*A23L 3/00*　(2006.01)
*A23N 12/00*　(2006.01)

(52) U.S. Cl. ......................... 99/404; 99/407; 99/443 C; 99/516

(58) Field of Classification Search .................. 99/330, 99/443 C, 443 R, 404, 407, 427, 516, 467, 99/477, 478
See application file for complete search history.

(56) References Cited

U.S. PATENT DOCUMENTS

| | | | |
|---|---|---|---|
| 2,389,330 A * | 11/1945 | Thompson | 198/463.4 |
| 4,092,911 A * | 6/1978 | Goodale | 99/483 |
| 4,214,013 A | 7/1980 | Hirahara | |
| 4,255,459 A * | 3/1981 | Glen | 426/521 |
| 4,563,364 A | 1/1986 | Carmichael et al. | |
| 4,582,047 A | 4/1986 | Williams | |
| 5,289,759 A | 3/1994 | Hufford | |
| RE35,259 E | 6/1996 | Williams | |
| 6,105,485 A | 8/2000 | Zittel | |
| 6,187,360 B1 | 2/2001 | Zittel | |
| 2007/0119312 A1 * | 5/2007 | Broderick | 99/584 |

FOREIGN PATENT DOCUMENTS

| | | |
|---|---|---|
| CA | 2087418 | 9/1993 |
| CA | 2336156 | 11/2000 |
| WO | 00/64284 | 11/2000 |

* cited by examiner

*Primary Examiner*—Reginald L Alexander
(74) *Attorney, Agent, or Firm*—Gowling Lafleur Henderson LLP (57) ABSTRACT

A continuous flow pressurized cooker/blancher cooks a food product by continuously transporting the product on a conveyor system and by forcing steam through or over the surface of the food product. The food product to be cooked may be, but is not limited to, seafood and preferably crustaceans. The cooker/blancher includes an exterior pressurized housing, an infeed weigh hopper, an infeed and an outfeed transfer device, and an internal conveyor system. Each transfer device comprises an internal and an external transfer chamber. A pressure assembly forces steam into the exterior pressurized housing while the transfer device is adapted to maintain a selected pressurized environment.

5 Claims, 6 Drawing Sheets

CONTINUOUS FLOW PRESSURIZED COOKER/BLANCHER

FIELD OF THE INVENTION

This invention relates to a continuous flow pressurized steam cooker/blancher for cooking, steaming or blanching a continuous flow of food product.

BACKGROUND OF THE INVENTION

Figure 5:
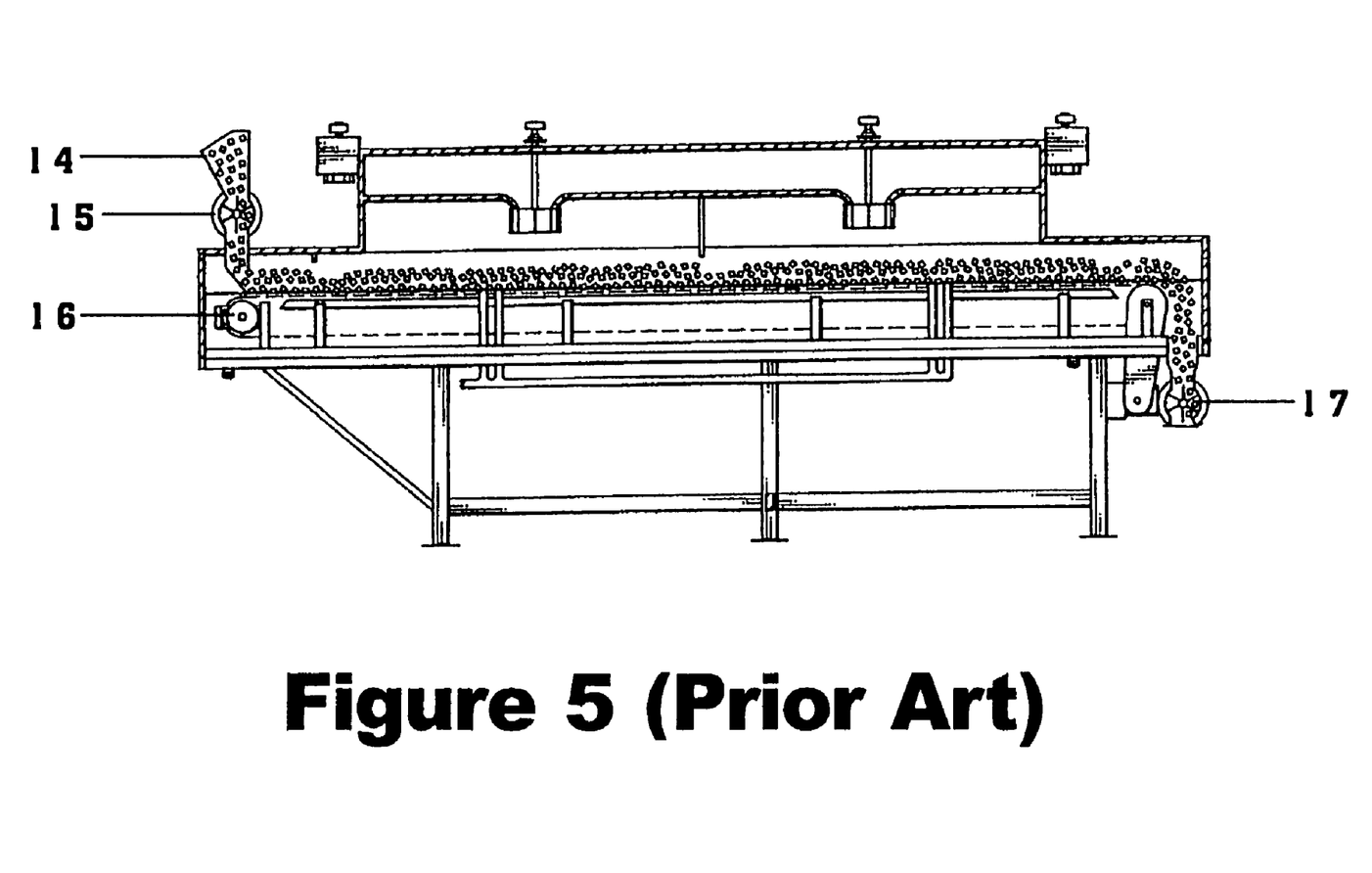
FIG. 5 is a side cross-sectional view of a conventional continuous flow cooker/blancher.

A conventional continuous process cooker/blancher, an example of which can be seen in Canadian Patent No. 2,087,418 (Hufford), processes food in a continuous fashion without the need for human intervention or handling of the food particles. FIG. 5 of the drawings shows an example of such a conventional continuous process cooker/blancher. Food particles are transferred from a supply conveyor system to the cooker/blancher apparatus through an upper hopper 14. In a conventional system, the food particles, having passed through the upper hopper 14 will move into an upper rotary valve 15. The upper rotary valve 15 may be comprised of several fins resulting in numerous compartments to be filled by food particles and transferred to a conveyor system 16. After travelling through the pressurized chamber the food particles will fall from the conveyor system 16 into a lower rotary valve 17 and finally out of the cooker/blancher apparatus.

In the above described prior art cooker/blancher, food product is fed in a continuous fashion into the upper rotary valve 15 and the volume of food processed is controlled only by the speed at which the system is operating and the capacity of the compartments within the rotary valves 15, 17. It is only possible to control the volume of food product being processed by altering the speed of the infeed conveyor, or the speed of the rotary valve, or both.

Further, damage may occur to food products of a delicate nature when subjected to the rotation with the upper rotary valve 15 or lower rotary valve 17. In the event that a single compartment may become filled to capacity, any food product near the edge of the fins, may become damaged by pressure or friction forces generated against the circumference of the rotary valves 15, 17.

SUMMARY OF THE INVENTION

It is therefore an object of the present invention to provide an improved pressurized steam cooker/blancher wherein food product is transferred to the system in a more controlled fashion. Additionally, the transfer of the food product from the exterior environment to the interior environment of the cooker/blancher is performed such that damage to the food product is reduced and the overall efficiency of the system improved.

According to a first aspect of the present invention, there is provided a pressurized cooking/blanching apparatus for processing and cooking/blanching of food products, comprising: an cooking/blanching chamber sealed from the external environment and capable of sustaining an interior pressure elevated above atmospheric pressure, an infeed weigh hopper for receiving and measuring an appropriate amount of food product, a first transfer device to receive product from the infeed weigh hopper and transfer the food product from an environment at atmospheric pressure to an environment of elevated pressure within the cooking/blanching chamber, a conveyor belt inside the cooking/blanching chamber to receive the food product from the first transfer device and to transport the food product within the cooking/blanching chamber, a second transfer device to receive the food product from the conveyor belt, transfer the food product from the elevated pressure environment to an atmospheric pressure environment and to discharge the food product from the cooking/blanching apparatus, and a system controller for electrically controlling the operation of the cooking/blanching apparatus.

The pressurized cooking/blanching apparatus may also comprise a sump positioned near to the bottom of the cooking/blanching chamber to facilitate the collection and removal of any liquid by-product of the cooking/blanching process.

The cooker/blancher according to the first aspect of the present invention may further comprise a recirculating water system for cushioning and protecting the food product. The recirculating water system preferably introduces water into the first and second transfer device prior to the contact of the food product therewith, thereby providing additional suspension and protection for the food product while being transferred.

The first and second transfer device preferably each comprise a first transfer chamber for transferring the food product to or from the conveyor belt, a void area to allow for pressurization or de-pressurization of the food product, and a second transfer chamber for transferring the food product into or out of the cooking/blanching apparatus, the first and second transfer chambers each being adapted to form pressure seals with the void area.

The cooker/blancher according to the first aspect of the present invention may further comprise a rotational speed controller for controlling the rotational speed of the first transfer chamber of the first transfer device. By adjusting the rotation speed of the first transfer chamber, the food product can be evenly distributed onto the conveyor belt resulting in a more efficient use of steam and a more consistent processing.

While it is preferred for the pressurized cooking/blanching apparatus of the present invention to operate under continuous flow, for continuous processing and cooking/blanching of the food products, it is also envisioned that the cooker/blancher may also be used in a batch format.

According to a second aspect, the invention further provides a transfer device for transferring food products to or from a pressurized cooking/blanching apparatus. The transfer device comprises a first transfer chamber, a second transfer chamber, and a void area capable of selectively forming a pressure seal with one or both of the first and second transfer chambers. The void area is situated between the first and second transfer chambers.

Movement of the first and second transfer chambers of the transfer device may be effected by a variety of mechanical means, such as actuation cylinders that hydraulically or otherwise drive the movement of the transfer chambers.

As a third aspect of the invention, there is also provided a method for transferring food products between an outside environment and a pressurized environment. The method comprises a first step of forming a pressure seal between the pressurized environment and an internal transfer chamber; a second step of introducing food product from the outside environment into an external transfer chamber; a third step of lowering and rotating the external transfer chamber to transfer the food product through a void area and into the internal transfer chamber; a fourth step of rotating and raising the external transfer chamber to form a pressure seal between the void area and the outside environment; a fifth step of raising the internal transfer chamber thereby increasing pressure in the void area and the internal transfer chamber to pressure equivalent to the pressurized environment; and a sixth step of rotating the internal transfer chamber and depositing the food product into the pressurized environment.

BRIEF DESCRIPTION OF THE DRAWINGS

A preferred embodiment of the invention is described below with reference to the accompanying drawings, in which.

DETAILED DESCRIPTION OF THE INVENTION

Figure 1:
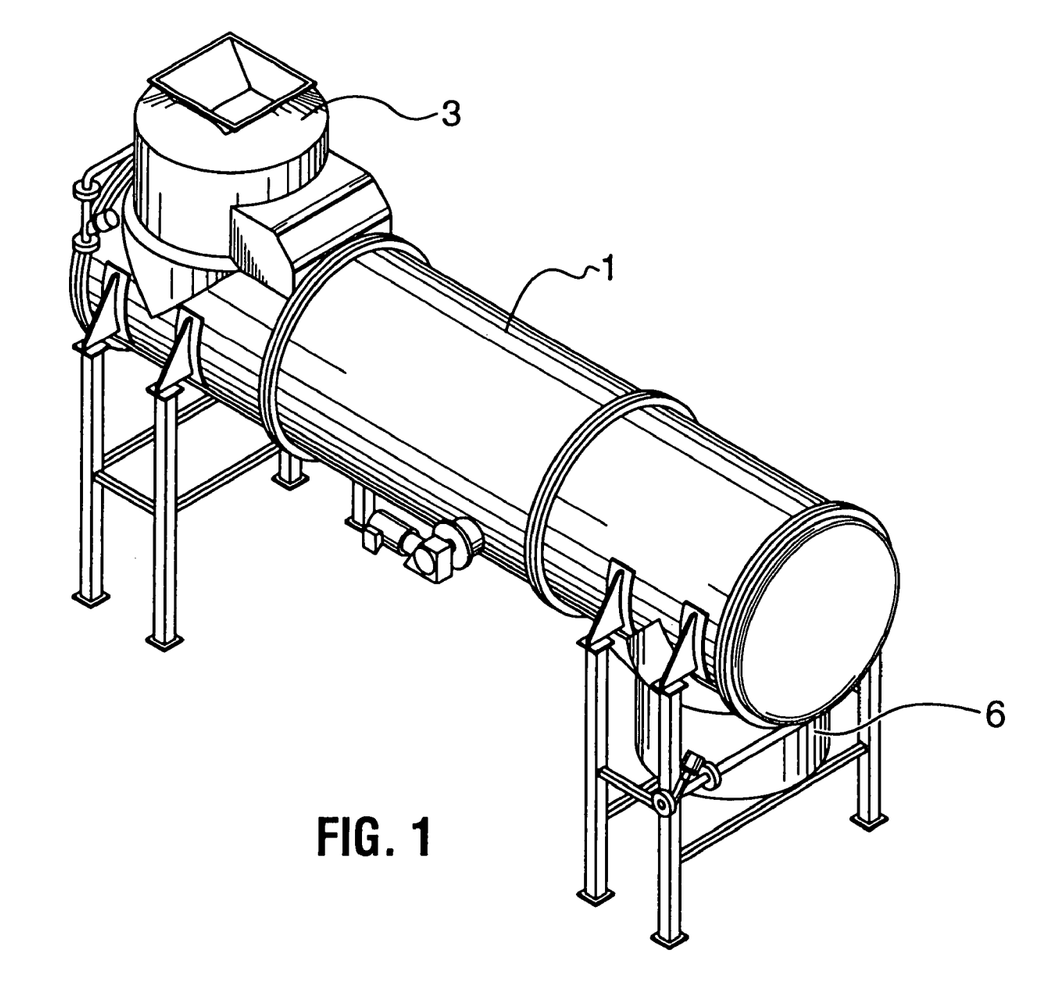
FIG. 1 is a perspective view of a continuous flow pressurized cooker/blancher of the present invention.

Referring to FIG. 1, in a continuous flow pressurized cooker/blancher, according to the present invention, an infeed conveyor (not shown) is positioned above a storage hopper (not shown). The storage hopper (not shown) is positioned above the infeed weigh hopper 3 connected at one end of the main housing, or cooking/blanching chamber 1 of the cooker/blancher. Positioned at the bottom of the opposite end of the main housing 1, is a discharge chute 6.

Figure 2:
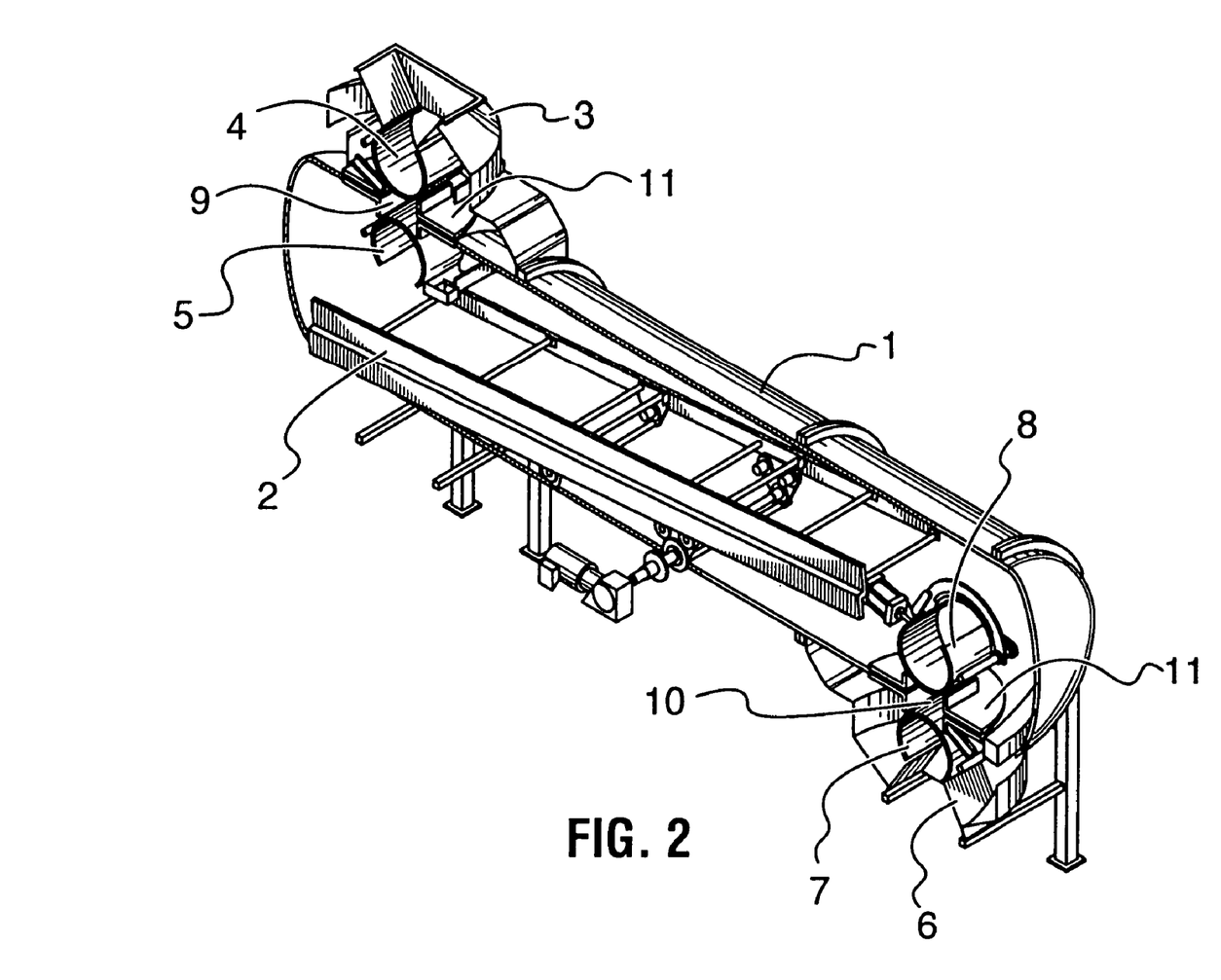
FIG. 2 is a cross-sectional view of a continuous flow pressurized cooker/blancher of the present invention as shown in FIG. 1.

Referring to FIG. 2, enclosed within the infeed weigh hopper 3 is an upper external transfer chamber 4 and an upper internal transfer chamber 5, connected at a base flange 11, forming an upper void area 9. Below the upper internal transfer chamber 5, one end of a conveyor belt 2 is positioned. The conveyor belt 2 travels substantially horizontally, and below the opposite end a lower internal transfer chamber 8 can be found. The lower internal transfer chamber is connected from above to the lower external transfer chamber 7 via a second base flange 11, forming the lower void area 10. Below the lower external transfer chamber 7, the discharge chute 6 can be found.

The infeed conveyor (not shown) moves food product from a storage hopper (not shown) into the infeed weigh hopper 3. A system controller 15 is electrically connected to the infeed weigh hopper 3 such that the infeed weigh hopper 3 may signal the system controller 15 to stop the infeed conveyor once the infeed weigh hopper 3 is filled to a correct level. When the infeed weigh hopper 3 is again ready for product, it will signal the system controller 15 to start the infeed conveyor (not shown) to again begin transferring food product.

Referring to FIG. 2, the infeed weigh hopper 3 meters an amount of food product necessary to fill the upper external transfer chamber 4. When further food product is required, the infeed weigh hopper 3 signals the system controller 15 to run the infeed conveyor (not shown) until a preset amount of food product is in the infeed weigh hopper 3. The infeed weigh hopper 3 then signals the system controller 15 to stop the infeed conveyor (not shown). Once the infeed weigh hopper 3 has been filled, and the upper external transfer chamber 4 is ready for product, the infeed weigh hopper 3 releases the food product into the upper external transfer chamber 4.

Once food product has been transferred to the upper external transfer chamber 4, the system controller 15 checks to ensure the upper internal transfer chamber 5 is in a sealed position suitable for receiving product from the upper external transfer chamber 4. The system controller 15 then vents the upper void area 9 between the upper external transfer chamber 4 and the upper internal transfer chamber 5 to atmospheric pressure, equalizing the pressure across the upper internal transfer chamber 5 and the upper void area 9. The void area pressure is examined by the system controller 15 to ensure that it is at atmospheric pressure and that there are no leaks. The upper external transfer chamber 4 is then raised, breaking its seal with the upper void area 9, and then the upper external transfer chamber 4 is rotated by 180 degrees, dumping the food product into the upper internal transfer chamber 5. The upper external transfer chamber 4 is then rotated 180 degrees in the reverse direction, and lowered to reseal with the upper void area 9. When the upper external transfer chamber 4 is returned to the original, ready position, the infeed weigh hopper 3 is signaled by the system controller 15 to deliver additional food product.

The upper void area 9 and upper internal transfer chamber 5 are then charged with steam from inside the main housing 1 via a steam inlet valve. The pressure within the upper void area 9 is then examined to ensure that it is at equilibrium with the pressure inside the main housing 1 of the cooker/blancher.

With food product in the upper internal transfer chamber 5 at the elevated pressure of the main housing 1, the upper internal transfer chamber 5 is then lowered, breaking its seal with the upper void area 9, and rotated 180 degrees, emptying its contents onto the internal conveyor belt 2.

The upper internal transfer chamber 5 is then rotated 180 degrees in the reverse direction, and raised to seal with the upper void area 9. The upper void area 9 is then vented to atmospheric pressure, and the pressure checked by the system controller 15 completing one complete cycle of food product loading.

Inside the main housing 1, the conveyor belt 2 travels at such a rate as to expose the food product to the pressure and temperature inside the main housing 1 for a desired amount of time. The conveyor belt 2 may run at a selectable, but fixed speed, such that the duration of time the food product is on the belt relates to the cook/blanch time. Alternatively, the conveyor belt 2 may be encoded, allowing the system controller 15 to track the location on the belt of each load of food product.

The lower interior transfer chamber 8, lower void area 10, and lower external transfer chamber 7 are operated in a manner analogous to the infeed operation.

Condensate from the cooking/blanching steam and liquid from the food product will accumulate in the bottom of the main housing 1. Liquid removal means may therefore be provided to remove and recover this liquid while the system is in process. The main housing 1 is typically mounted at a slight angle to allow the liquid to flow to one end of the main housing 1. At that end, the collected liquid may pass through a sump valve (not shown) into a discharge sump 16. The sump valve (not shown) between the sump 16 and the main housing 1 are then closed and the sump 16 brought to atmospheric pressure. A lower discharge valve (not shown), situated at the bottom of the sump 16, may then be opened, emptying the sump 16 of the liquid contained within.

The system controller 15 may control the sump valve (not shown) and the lower discharge valve (not shown) upon receiving an electric signal from a level switch (not shown), which indicates the necessity to empty the sump 16. A cooling device (not shown) may also be included to reduce the temperature of the collected liquid to a safe and manageable level.

Figure 3:
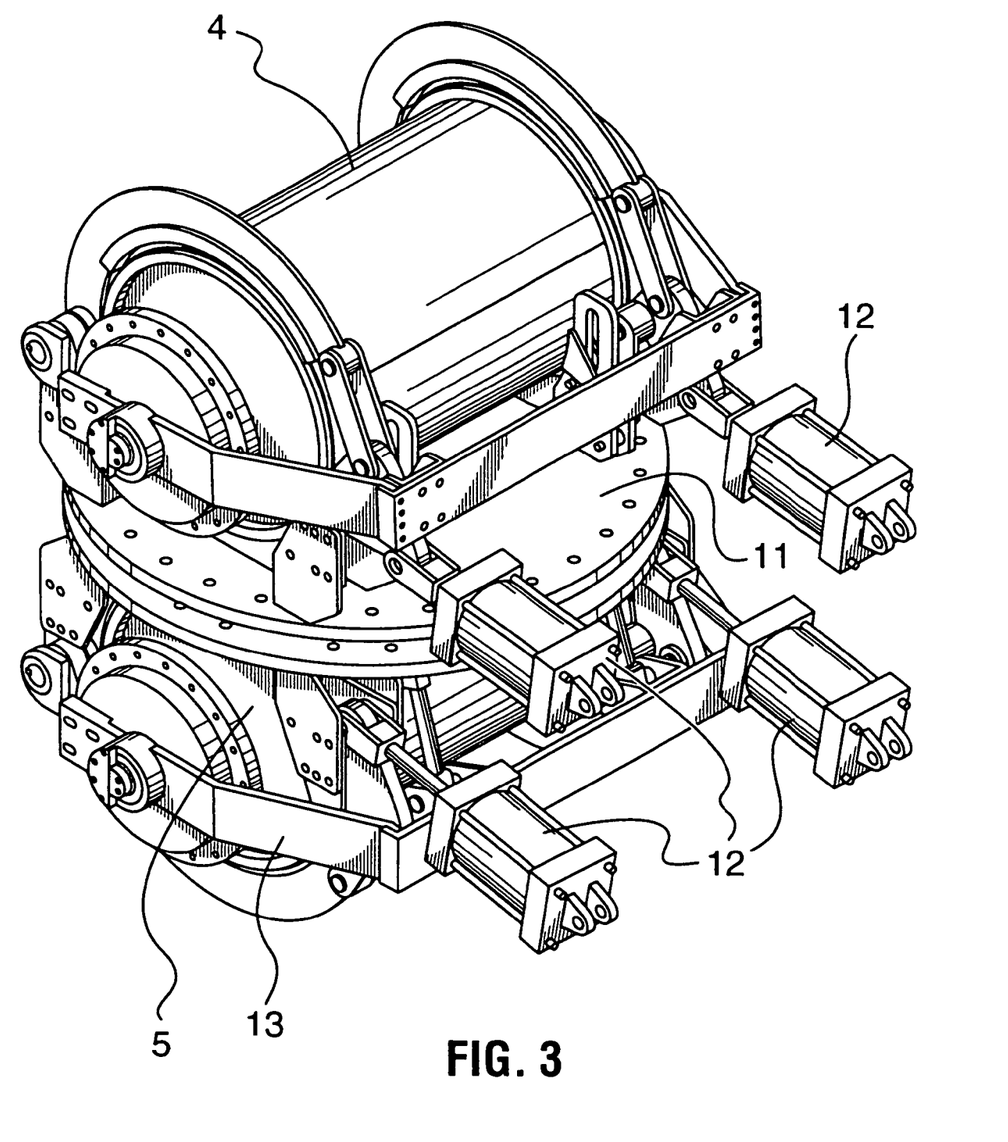
FIG. 3 is a perspective view of a transfer device according to the present invention.

FIG. 3 depicts an embodiment of the transfer device of the invention. As shown, the transfer device comprises the aforementioned upper external transfer chamber 4 and the upper internal transfer chamber 5. The transfer device also comprises a plurality of actuation cylinders 12 and one of more chamber positioning arms 13. When the system controller determines that the position of the upper external transfer chamber 4 or the upper internal transfer chamber 5 is to be changed, a signal is sent to the actuation cylinders 12, and the chamber positioning arm 13 is moved, thereby moving the associated transfer chamber into the desired position. The void area (not shown) between the upper external and upper internal transfer chambers 4, 5 is formed by the base flange 11.

Figure 4:
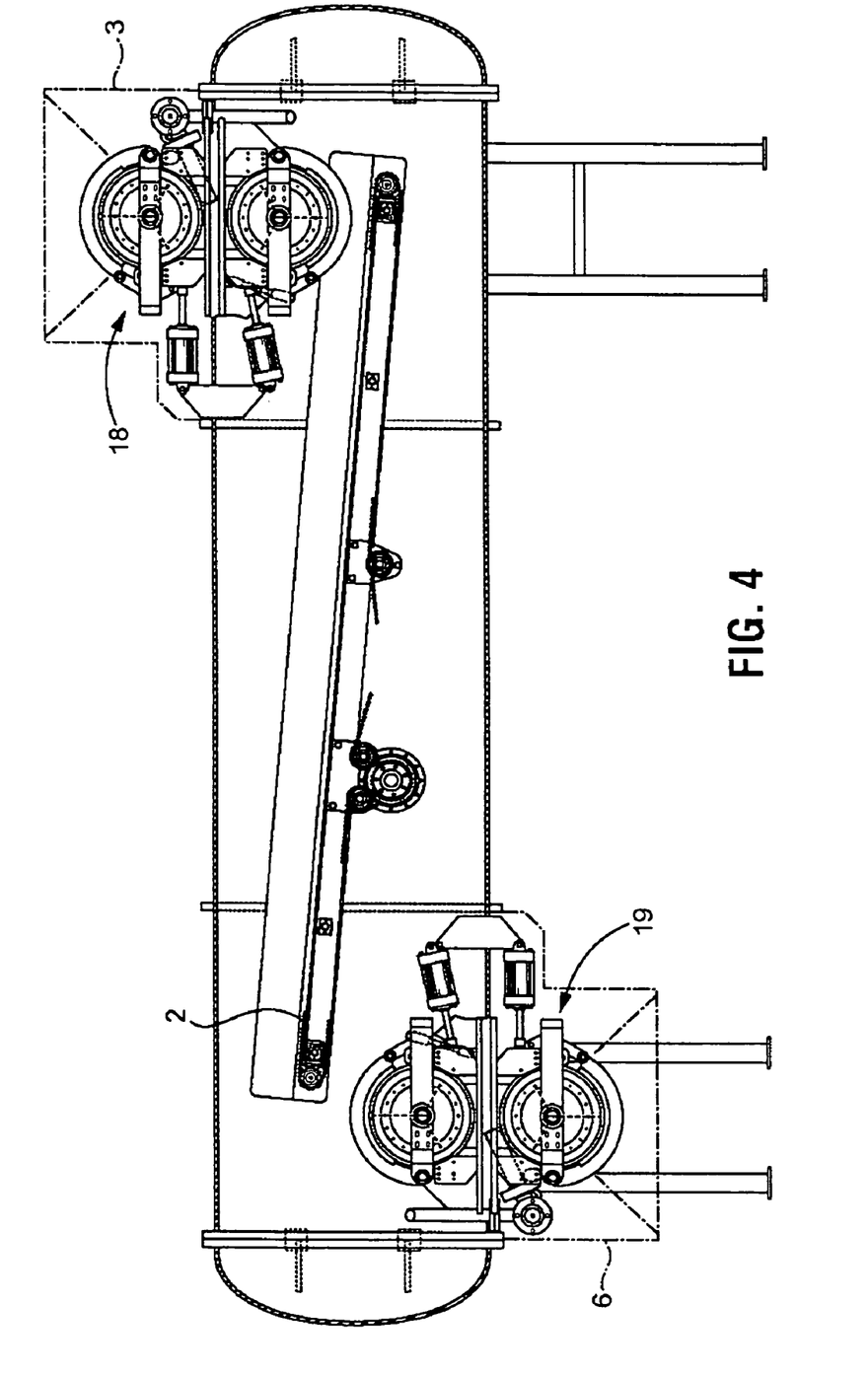
FIG. 4 is a cross-sectional side view of a continuous flow pressurized cooker/blancher of the present invention as shown in FIG. 1.

Referring to FIG. 4, and in contrast to the conventional cooker/blancher as shown in FIG. 5, the cooker/blancher of the present invention comprises the infeed weigh hopper 3 positioned above and in cooperation with the upper transfer device 18. Below the upper transfer device, a first end of the conveyor belt 2 is positioned. The discharge chute 6 is positioned below and in cooperation with the lower transfer device 19.

The foregoing are exemplary embodiments of the present invention, and a person skilled in the art would appreciate that modifications to these embodiments may be made without departing from the scope of the invention as defined in the appended claims. All documents identified above are herein incorporated by reference.

Figure 6:
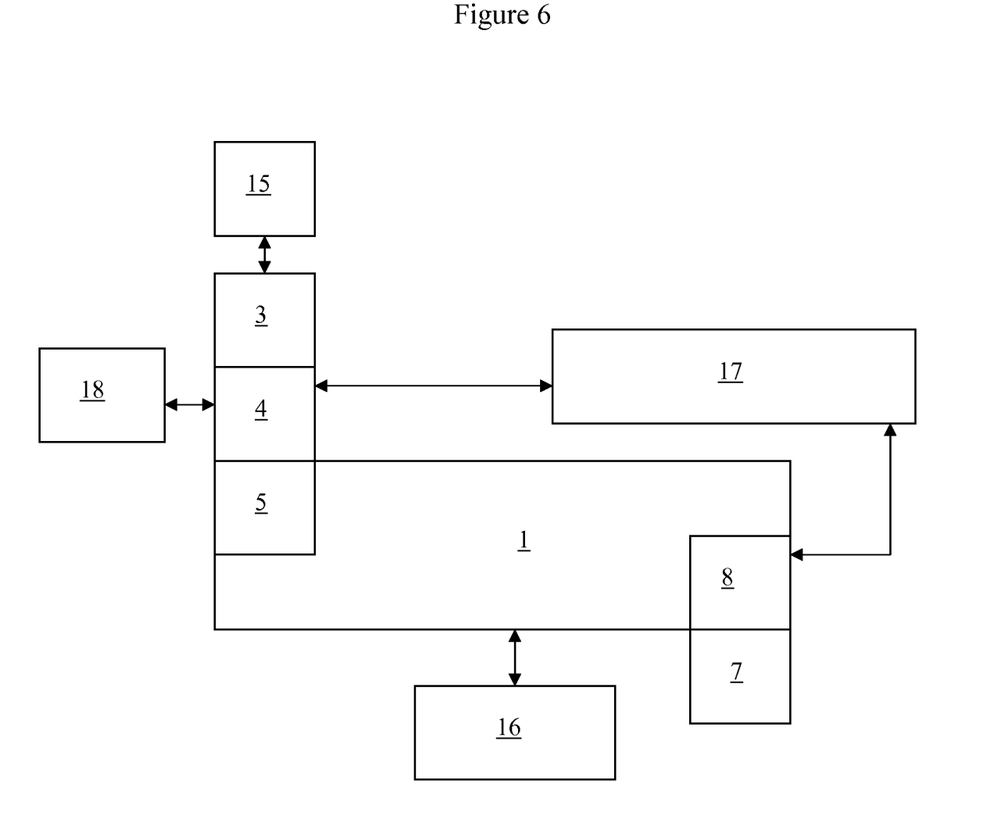
FIG. 6 is a schematic diagram of a continuous flow pressurized cooker/blancher apparatus of the present invention.

The pressurized cooking/blanching apparatus may further comprise a recirculating water system 17 for cushioning and protecting the food product. The recirculating water system introduces water into the first and second transfer devices prior to the food product, i.e. into the transfer chambers 4, 5, 8 and 8, thereby providing additional suspension and protection for the food product while being transferred.

The pressurized cooking/blanching apparatus may further comprise a rotational speed controller 18 for controlling a rotational speed of the upper external transfer chamber 4 of the first transfer device, allowing the food product to be evenly distributed onto the conveyor belt.

The embodiments of the present invention in which an exclusive property or privilege is claimed are defined as follows:

1. A pressurized cooking/blanching apparatus for processing and cooking/blanching of food products, comprising:
    a cooking/blanching chamber sealed from the external environment and capable of sustaining an interior pressure elevated above atmospheric pressure,
    an infeed weigh hopper for receiving and measuring an appropriate amount of food product,
    a first transfer device to receive food product from the infeed weigh hopper and transfer the food product from an environment at atmospheric pressure to an environment of elevated pressure within the cooking/blanching chamber, the first transfer device comprising
    a first transfer chamber and a second transfer chamber defining a void area therebetween;
    the first transfer chamber configured to move between a first position for receiving food product and a second position for transferring the food product to the second transfer chamber,
    the second transfer chamber configured to move between a first position for receiving the food product from the first transfer chamber and a second position for transferring the food product into the cooking/blanching chamber,
    the void area adapted to be vented to atmospheric pressure and to be actively pressurized to the interior pressure of the cooking/blanching chamber,
    each of the first and second transfer chambers adapted to independently form pressure seals with the void area when positioned in their respective first positions,
    a conveyor belt inside the cooking/blanching chamber to receive the food product from the first transfer device and to transport the food product within the cooking/blanching chamber,
    a second transfer device to receive the food product from the conveyor belt, transfer the food product from the elevated pressure environment to an atmospheric pressure environment and to discharge the food product from the cooking/blanching apparatus, the second transfer device comprising
    a third transfer chamber and a fourth transfer chamber defining a second void area therebetween,
    the third transfer chamber configured to move between a first position for receiving food product from the conveyor belt and a second position for transferring the food product to the fourth transfer chamber,
    the fourth transfer chamber configured to move between a first position for receiving the food product from the third transfer chamber and a second position for transferring the food product out of the cooking/blanching chamber,
    the second void area adapted to be actively pressurized to the interior pressure of the cooking/blanching chamber and to be vented to atmospheric pressure,
    each of the third and fourth transfer chambers adapted to independently form pressure seals with the void area when positioned in their respective first positions, and
    a system controller for electrically controlling the operation of the cooking/blanching apparatus.

2. A pressurized cooking/blanching apparatus according to claim 1, further comprising a sump positioned near to the bottom of the cooking/blanching chamber to facilitate the collection and removal of any liquid by-product of the cooking/blanching process.

3. A pressurized cooking/blanching apparatus according to claim 1, wherein said cooking/blanching apparatus further comprises a recirculating water system for cushioning and protecting the food product, said recirculating water system introducing water into the first and second transfer device prior to the food product, thereby providing additional suspension and protection for the food product while being transferred.

4. A pressurized cooking/blanching apparatus according to claim 1, wherein said cooking/blanching apparatus further comprises a rotational speed controller for controlling a rotational speed of the first transfer chamber of the first transfer device, allowing the food product to be evenly distributed onto the conveyor belt.

5. A pressurized cooking/blanching apparatus according to claim 1, wherein said cooking/blanching apparatus is adapted to operate under continuous flow for continuous processing and cooking/blanching of the food products.

* * * * *

UNITED STATES PATENT AND TRADEMARK OFFICE
CERTIFICATE OF CORRECTION

| | | |
|---|---|---|
| PATENT NO. | : 7,748,313 B2 | Page 1 of 1 |
| APPLICATION NO. | : 10/854788 | |
| DATED | : July 6, 2010 | |
| INVENTOR(S) | : Harold L. Tyndall | |

It is certified that error appears in the above-identified patent and that said Letters Patent is hereby corrected as shown below:

Title page,
Item 73 the Assignee: "Charlottetown Metal Products Ltd." should be deleted.

Signed and Sealed this
Eighteenth Day of October, 2011

David J. Kappos
*Director of the United States Patent and Trademark Office*